(12) United States Patent
Kahnert

(10) Patent No.: US 7,629,543 B2
(45) Date of Patent: Dec. 8, 2009

(54) SWITCH ASSEMBLY HAVING A MECHANICALLY ACTUATED OVERRIDE

(75) Inventor: Christopher A. Kahnert, Euclid, OH (US)

(73) Assignee: Delta Systems, Inc., Streetsboro, OH (US)

( * ) Notice: Subject to any disclaimer, the term of this patent is extended or adjusted under 35 U.S.C. 154(b) by 208 days.

(21) Appl. No.: 11/731,685

(22) Filed: Mar. 30, 2007

(65) Prior Publication Data

US 2008/0236999 A1    Oct. 2, 2008

(51) Int. Cl.
*H01H 3/00* (2006.01)

(52) U.S. Cl. .................................. 200/17 R; 200/43.01

(58) Field of Classification Search .............. 200/11 R, 200/12, 13, 11 J, 43.01–43.04, 43.08, 336, 200/564, 567, 179, 17 R
See application file for complete search history.

(56) References Cited

U.S. PATENT DOCUMENTS

| | | | | |
|---|---|---|---|---|
| 4,051,915 A | * | 10/1977 | Behrens | 180/271 |
| 5,000,650 A | * | 3/1991 | Brewer et al. | 414/699 |
| 5,032,737 A | * | 7/1991 | Holm et al. | 307/9.1 |
| 5,252,791 A | * | 10/1993 | Williams | 200/11 C |
| 5,314,038 A | | 5/1994 | Peterson, Jr. | |
| 5,866,954 A | | 2/1999 | Daniel et al. | |
| 5,994,857 A | | 11/1999 | Peterson et al. | |
| 6,056,074 A | | 5/2000 | Heal et al. | |
| 6,109,010 A | | 8/2000 | Heal et al. | |
| 6,154,364 A | | 11/2000 | Girrens et al. | |
| 6,316,891 B1 | | 11/2001 | Hough | |
| 6,411,045 B1 | | 6/2002 | Nerone | |
| 6,437,458 B1 | | 8/2002 | Baggett | |
| 6,591,594 B2 | | 7/2003 | Hancock et al. | |
| 6,720,679 B2 | | 4/2004 | Harada | |
| 6,758,292 B2 | | 7/2004 | Shoemaker | |
| 7,128,177 B2 | | 10/2006 | Harvey et al. | |
| 7,131,509 B2 | | 11/2006 | Harvey et al. | |
| 7,165,398 B1 | | 1/2007 | Holder et al. | |
| 7,168,519 B2 | | 1/2007 | Harvey et al. | |
| 7,224,088 B2 | | 5/2007 | Shoemaker et al. | |
| 7,237,633 B2 | | 7/2007 | Straka et al. | |
| 7,422,078 B2 | * | 9/2008 | Straka et al. | 180/53.6 |
| 2004/0026138 A1 | | 2/2004 | Shoemaker | |
| 2004/0124026 A1 | | 7/2004 | Walters et al. | |
| 2004/0201286 A1 | | 10/2004 | Harvey et al. | |
| 2005/0262819 A1 | | 12/2005 | Weber et al. | |
| 2005/0274098 A1 | | 12/2005 | Weber et al. | |
| 2008/0143193 A1 | | 6/2008 | Straka et al. | |

* cited by examiner

*Primary Examiner*—Michael A Friedhofer
*Assistant Examiner*—Lisa N Klaus
(74) *Attorney, Agent, or Firm*—Tarolli, Sundheim, Covell & Tummino LLP

(57) ABSTRACT

A method and apparatus for enabling reverse mow condition in a tractor comprises a switch assembly having an ignition switch that is rotatable through a plurality of positions, a housing for supporting the ignition switch, and an actuator movably located in the housing. The enabling of a reverse mow condition is achieved by displacing the actuator from a rest position to two separate and distinct positions.

15 Claims, 8 Drawing Sheets

SWITCH ASSEMBLY HAVING A MECHANICALLY ACTUATED OVERRIDE

FIELD OF THE INVENTION

The present disclosure relates generally to a switch assembly and, in particular, the present disclosure concerns a switch assembly designed to prevent an operator of a riding mower to mow in the reverse direction unless an override associated with the switch assembly is intentionally engaged.

BACKGROUND

Interlock circuits have been developed for lawn and garden tractors and similar vehicles that prevent these vehicles from being operated in an unsafe way. These interlock circuits typically include switches that are positioned to monitor various components of the lawn and garden tractor. Examples of components that may be monitored with switches include the seat, the clutch, the brake, the power take off, and the transmission. Switches used in interlock circuits typically include an elongated actuator that is linearly movable from a normal position to an actuated position. The states of the switches in the interlock circuit either indicate a safe condition or a potentially unsafe condition. If the states of the switches indicate a safe condition, the vehicle is allowed to continue to operate. If the states of the switches indicate an unsafe condition, the interlock circuit prevents continued operation of the vehicle or limits operation of one or more components of the vehicle.

SUMMARY

The present disclosure relates to a switch assembly enabling reverse mow condition in a tractor comprising a switch assembly having an ignition switch that can be rotated through a plurality of positions, a housing for supporting the ignition switch, and an actuator movably located in the housing. The enabling of a reverse mow condition is achieved by displacing the actuator from a rest position to two separate and distinct positions.

The present disclosure further relates to a switch assembly comprising a dial that is rotated in unison with an ignition switch through a plurality of positions, a housing for supporting the ignition switch, and an actuator moveable with respect to the housing. The reverse mow condition is achieved when the actuator is translated from a non-enabling position to an enabling position then rotating the dial from a non-enabling orientation to an enabling orientation.

The present disclosure also relates to a method for enabling a reverse mow condition in a tractor through a switch assembly comprising the steps of translating an actuator from a non-enabling position to an enabling position such that the actuator is substantially aligned with a switch for enabling a reverse mow condition. The method further comprises rotating the actuator from a non-enabling orientation to an enabling orientation such that the actuator engages the switch, thereby allowing a reverse mow condition.

The present disclosure yet further relates to a method of using a switch assembly for enabling a reverse mow condition in a tractor during or prior to moving in a reverse direction comprising the steps of translating an actuator from a non-enabling position to an enabling position such that the actuator is substantially aligned with a switch for enabling a reverse mow condition. The method further comprises the step of rotating the actuator from a non-enabling orientation to an enabling orientation while the actuator remains in the enabling position such that the actuator engages the switch, thereby allowing a reverse mow condition.

The present disclosure also yet further relates to a switch assembly for enabling a reverse mow condition for a tractor during or prior to moving in a reverse direction comprising a dial that is rotated in unison with an ignition switch through a plurality of positions, a housing for supporting the ignition switch, and an actuator moveable with respect to the dial. The actuator includes first and second ends. The switch assembly further comprises a plunger switch having a plunger that when depressed enables the tractor for a reverse mow condition and an inclined surface located at the first end of the actuator that graduates to an abutment on a side of the actuator opposite the inclined surface side on the first end. A reverse mow condition is enabled when the actuator is translated from non-enabling position to an enabling position and then rotating the dial from a non-enabling orientation to an enabling orientation.

These and other objects, advantages, and features of the exemplary embodiments are described in detail in conjunction with the accompanying drawings.

BRIEF DESCRIPTION OF THE DRAWING

The foregoing and other features and advantages of the present invention will become apparent to one skilled in the art to which the present invention relates upon consideration of the following description of the invention with reference to the accompanying drawings, in which.

DETAILED DESCRIPTION OF THE DRAWINGS AND PREFERRED EMBODIMENTS

Figure 1:
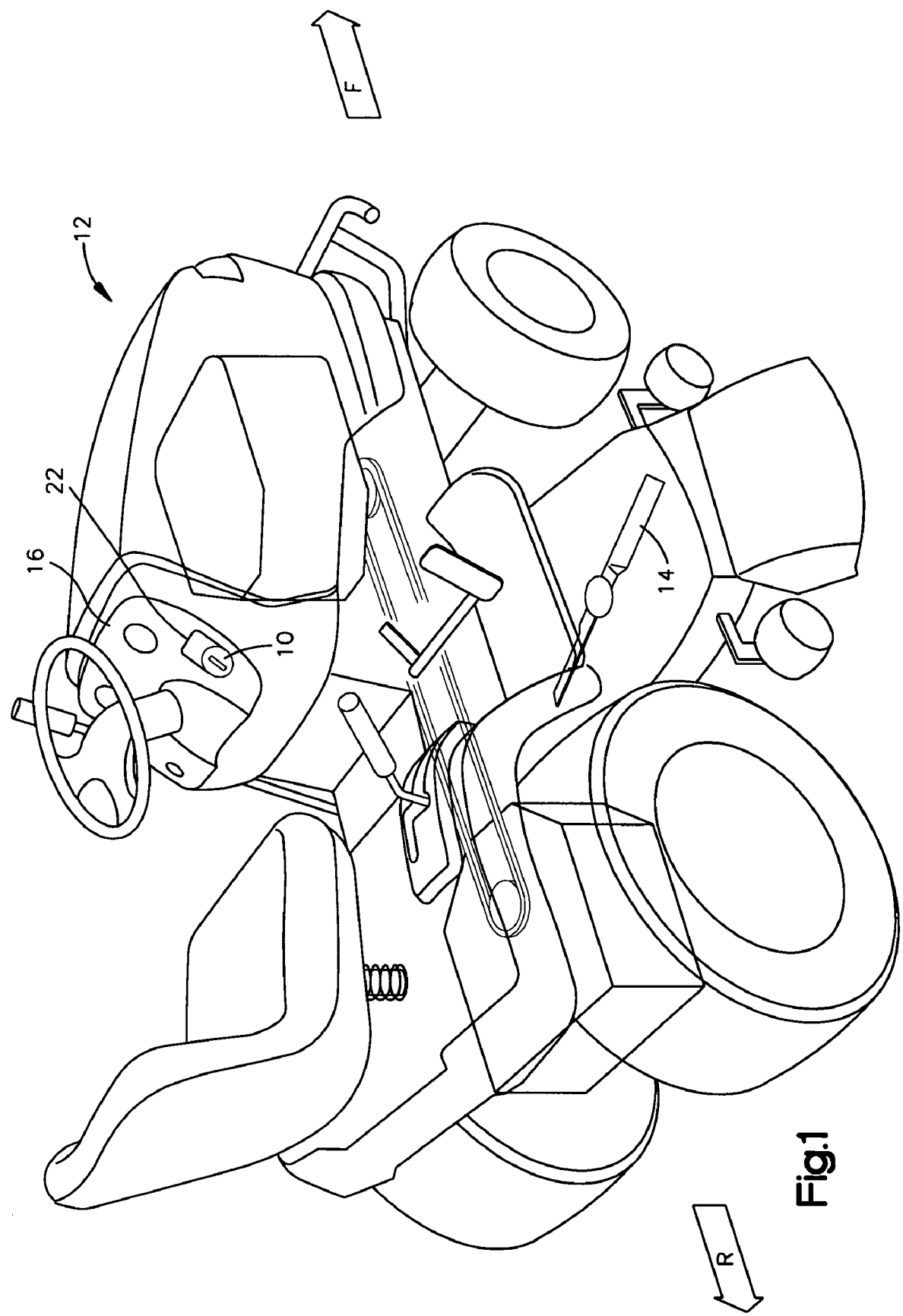
FIG. 1 is an illustration of a lawn and garden tractor.

The present disclosure concerns an electro-mechanical ignition switch assembly 10 that is adapted to a lawn and garden tractor 12 or similar vehicle as illustrated in FIG. 1. The garden tractor 12 through the switch assembly 10 enables a blade 14 to rotate for cutting grass, foliage, and the like (a "mowing condition") in a forward direction as indicated by arrow "F" in FIG. 1. The garden tractor 12 through the switch assembly 10 also enables the blade 14 to rotate for cutting grass, foliage, and the like (the mowing condition) in a reverse direction indicated by arrow "R" in FIG. 1. The enablement of the mowing condition whether in the forward or reverse direction is controlled by operation and design of the switch assembly 10. More specifically and as will be described below, the switch assembly 10 precludes a mowing condition in the reverse direction unless an override 100 in the switch assembly is intentionally engaged. The switch assembly 10 is shown as being mounted in a dash portion 16 of the tractor 12, but could be located anywhere on the tractor without departing from the spirit and scope of the claimed invention.

Figure 2:
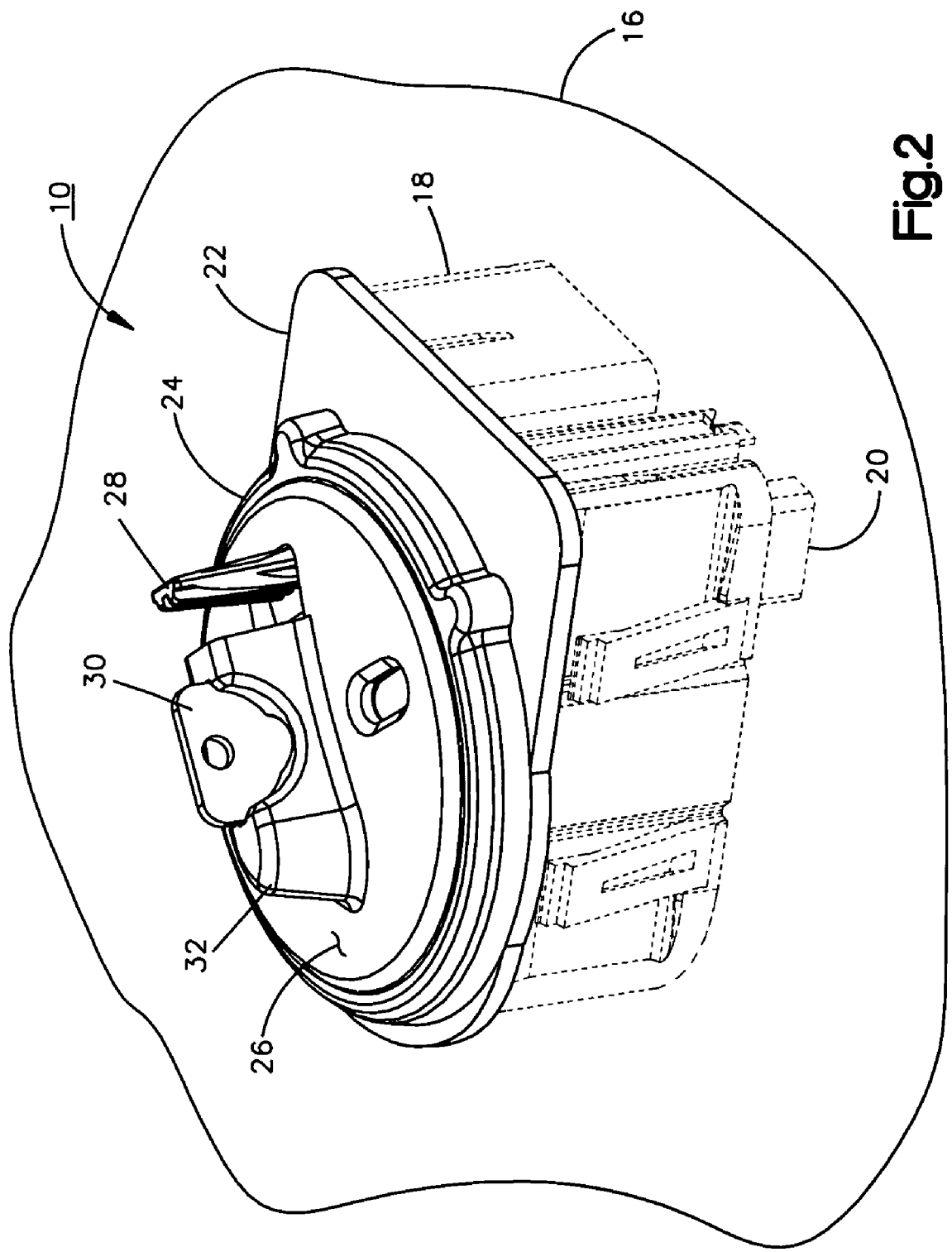
FIG. 2 is a perspective view of a switch assembly secured to a lawn tractor panel, the switch assembly being constructed in accordance with one exemplary embodiment of the present invention.

FIG. 2 illustrates an isometric view of the switch assembly 10 constructed in accordance with an exemplary embodiment of the present disclosure. The switch assembly 10 is shown in FIG. 2 as being attached through the dash portion 16. The switch assembly 10 includes a housing 18, a receptacle 20 for connecting electronics remotely located from the switch assembly 10, via ribbon cables or wiring harnesses (not shown). The switch assembly 10 further includes a plate 22 located just above and in contact with the dash portion 16. Located on a side of the dash portion 16 on top of the plate 22 is a retaining ring 24 for securing a dial 26 to the plate 22, which is integrally molded to the housing 18. Partially located within the dial 26 is an actuator 28. A key 30 is shown as being inserted into a key receiving housing 32 projecting from the surface of the dial 26.

Figure 3:
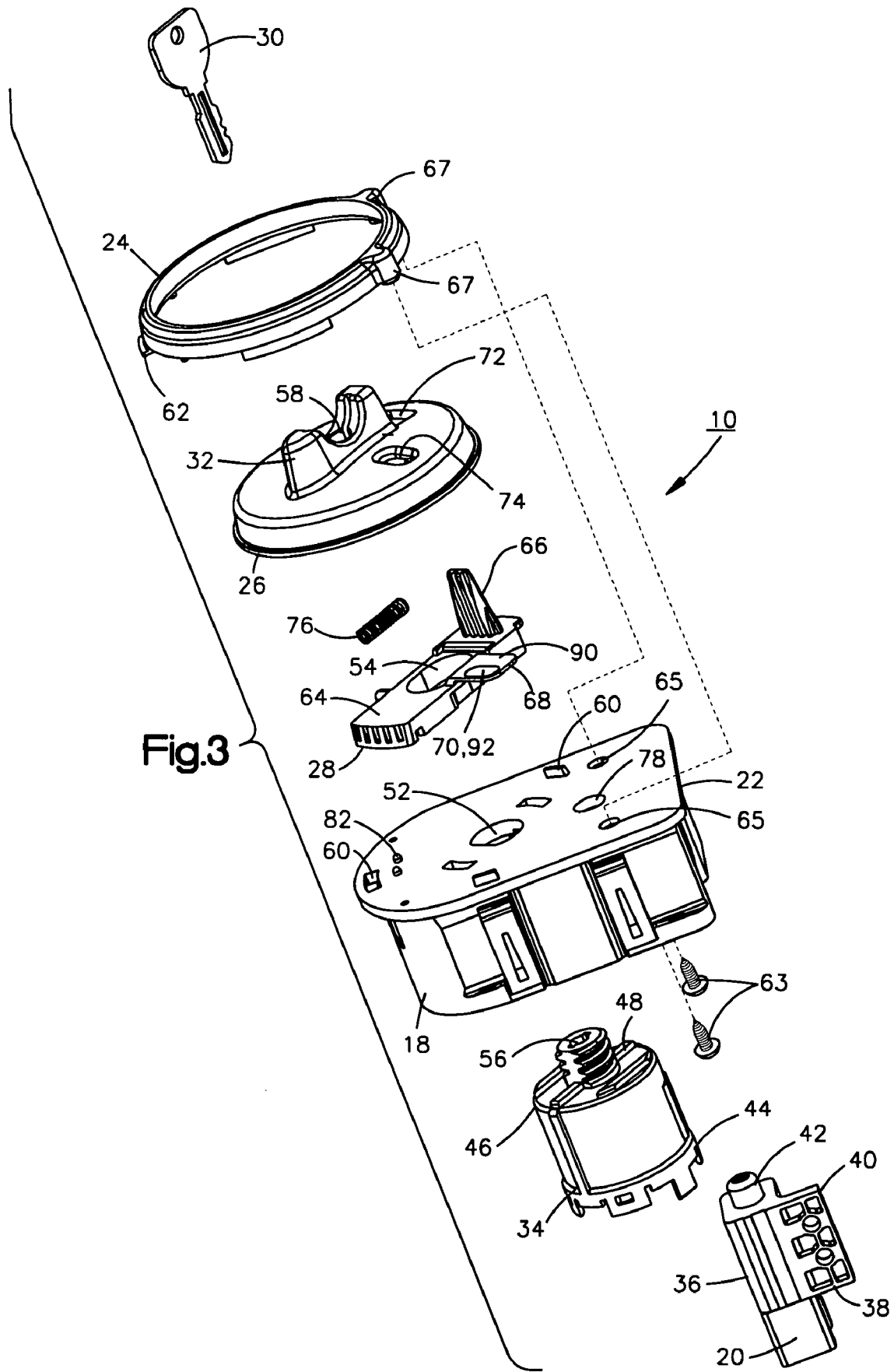
FIG. 3 is an exploded assembly view of the switch assembly of FIG. 2.
Figure 4:
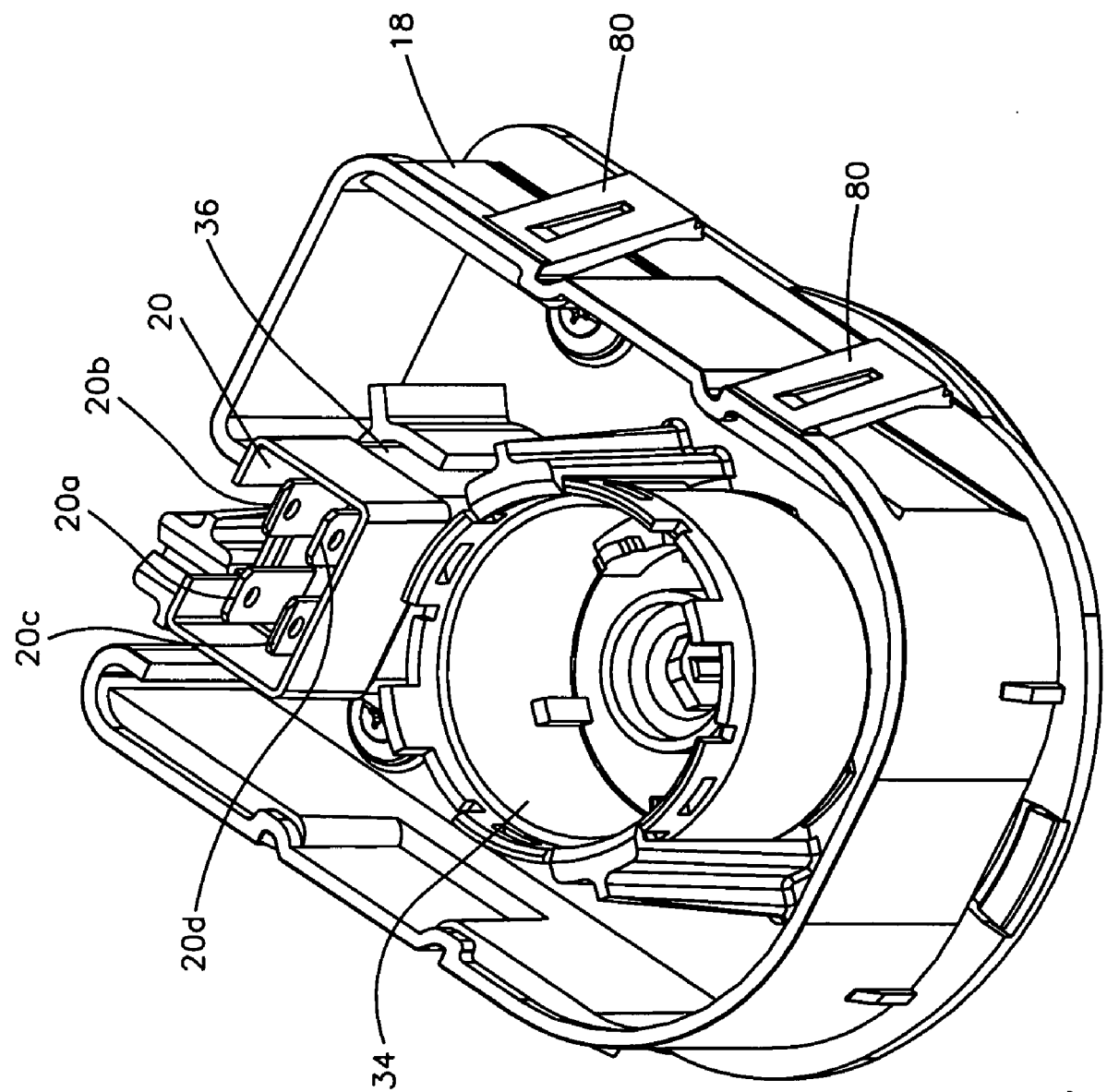
FIG. 4 is an inverted perspective view of the switch assembly of FIG. 2.

FIG. 3 illustrates an exploded assembly view of the switch assembly 10. Further included in the switch assembly 10, as best seen in FIG. 3 is a four (4) position ignition switch 34 and a plunger switch 36. The plunger switch includes first and second ends 38 and 40, respectively. The receptacle 20 is connected to the first end 38 of the plunger switch 36 and provides several connectors 20a-20d for attaching to a wiring harness (not shown) as best seen in FIG. 4, which is a bottom view of the switch assembly 10. FIG. 4 illustrates the attachment of the ignition 34 and plunger switch 36 to the switch assembly 10. The plunger switch 36 and ignition switch 34 provide a snap connection with the housing 18 for ease of assembly, but could be any type of connection without departing from the spirit and scope of the claimed invention. A plunger 42 is moveably located and extending from the second end 40 of the plunger switch 36.

Referring again to FIG. 3, the ignition switch 34 includes first and second ends 44, 46 respectively, and extending from the second end 46 is a threaded projection 48. As an alternative embodiment, the threaded projection 48 is used to attach the ignition switch 34 to the housing 18. The threaded projection 48 passes through aperture 52 located in the housing 18 plate 22. The threaded projection 48 extends beyond the plate 22 into a through slot 54 of the actuator 28, which may use the projection 48 as a guide during movement of the actuator. The threaded projection 48 includes a key opening 56 for receiving the key 30 as it is inserted through a key slot 58 extending from the key projection housing 32 of the dial 26.

The housing 18 plate 22 includes a connecting port 60 for securing a corresponding hook 62 that is located about the perimeter of the retaining ring 24 for securing the ring to the plate 22, with the panel 16, dial 26, and actuator 28 positioned therebetween. Screws 63 further secure the ring 24 to the plate 22 by passing through openings 65 into two bosses 67 located about the perimeter of the retaining ring. The actuator 28 comprises a main body 64 having an engagement projection 66 extending from the top of the main body. A flange portion 68 projects about a side of the main body 64 and includes a status identifier 70, being for example some indicia or color located on the surface of the flange portion. The dial 26 further includes first and second openings 72, 74 corresponding to the engagement projection 66 and status identifier 70 that will be discussed further below. A spring 76 is positioned between the dial 26 and actuator 28 for biasing the actuator in a disengaged direction. The housing 18 plate 22 further includes a second aperture 78 for receiving the plunger 42 of the plunger switch 36 upon assembly. Parametrically positioned about the side of the housing 18 is a plurality of locking tabs 80 for securing the housing in a mating structure of the tractor 12 (not shown).

Figure 5:
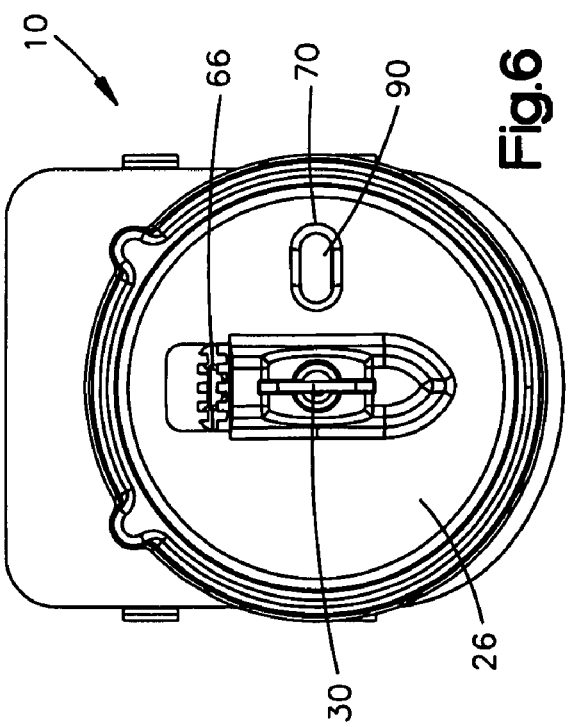
FIG. 5 is a plan view of the switch assembly in an off first position.
Figure 6:
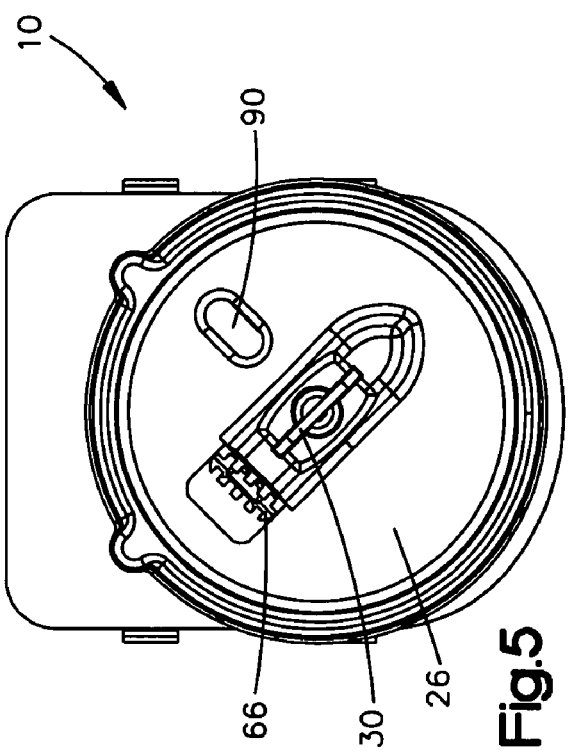
FIG. 6 is a plan view of the switch assembly in a no reverse mow run second position.
Figure 9:
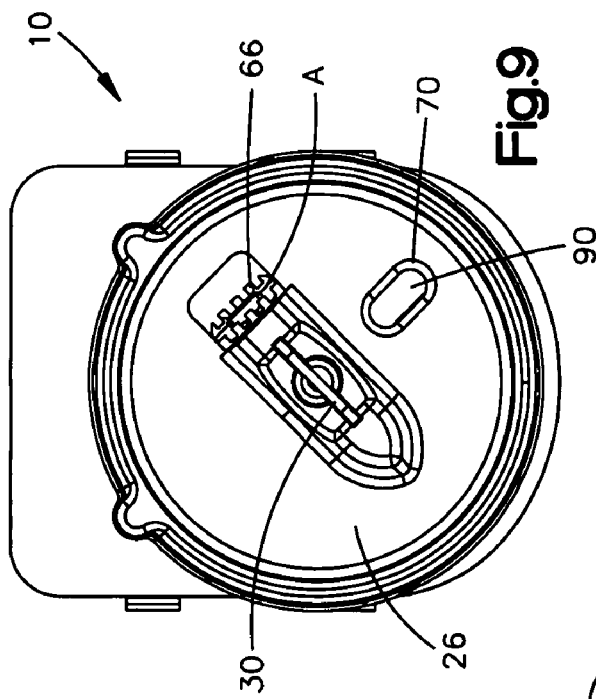
FIG. 9 is a plan view of the switch assembly in a no reverse mow run third position.
Figure 10:
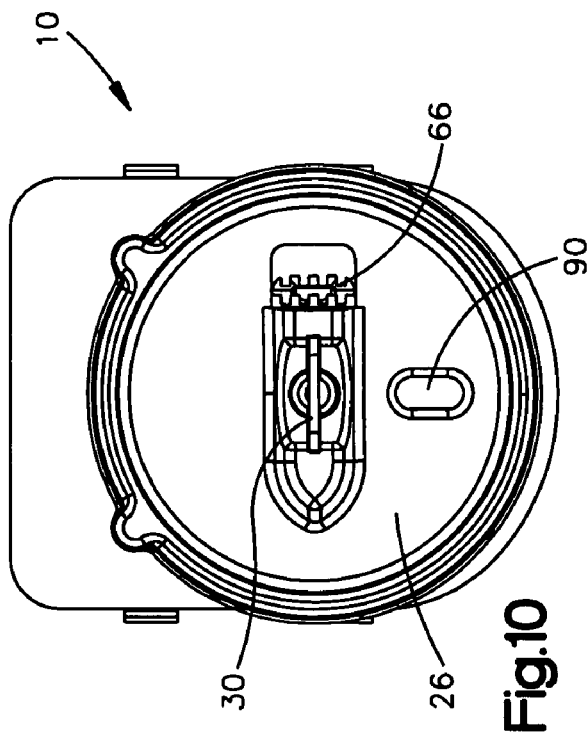
FIG. 10 is a plan view of the switch assembly in a start forth position.

FIGS. 5-10 illustrate positions 1-4 of the ignition switch 34 and disengaged "A" and engaged "B" positions of the override 100 via actuator 28 as oriented from a plan view of the switch assembly 10. With respect to each figure, FIG. 5 illustrates position 1 of the ignition switch 34, (also referred to as an off position) in which tractor 12 and blade 14 are inoperable. The dial 26 is linked to the four position ignition switch 34 via key 30, which together rotate through the positions described below. During operation, the dial/key 26, 30 are rotated from position 1 through positions 2, 3 to a spring-returned position 4 (start position) shown in FIG. 10, which starts the engine of the tractor 12. The dial/key 26, 30 are then spring returned to position 3 (run position) as illustrated in FIG. 9. When the dial/key 26, 30 are in the run position 3, an operator of the tractor 12 can drive the tractor forward F, and in reverse R directions, but only obtains a mow condition (rotation of the blade 14) when moving in the forward direction F. Similarly, a run position 2 of the dial/key 26, 30 exists as illustrated in FIG. 6 allowing the operator of the tractor 12 to drive the tractor forward F, and in reverse R directions, but only obtains a mow condition (rotation of the blade 14) when moving in the forward direction F. Should the operator leave the seat of the tractor 12 or attempt to mow in reverse while the dial/key 26, 30, are in the run positions 2, 3 of FIGS. 6 and 9, the tractor engine will stall. The operator at anytime can rotate the dial/key 26, 30 back through position 2 to position 1 to turn-off the engine of the tractor 12.

Figure 7:
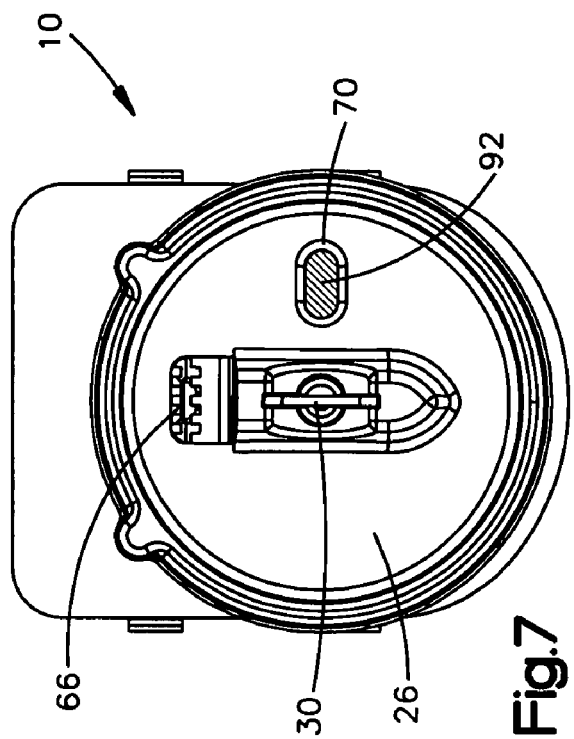
FIG. 7 is a plan view of the switch assembly in a reverse mow run second position.
Figure 11:
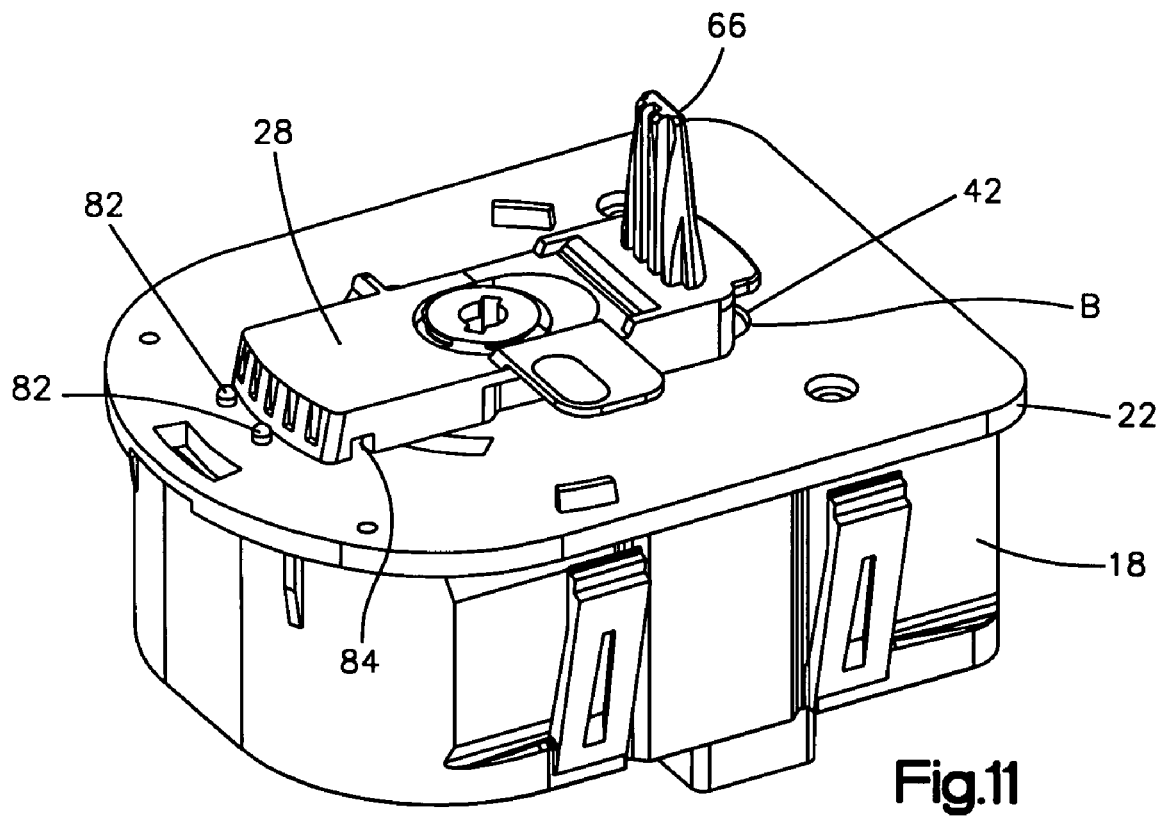
FIG. 11 is a partial assembly view of the switch assembly including an actuator located in a reverse mow run position of FIG. 7.

The override 100 is an assembly comprising the actuator 28, dial 26, housing plate 22, ignition switch 34, and plunger switch 36. The override 100 is engaged when it is desirable for the operator to enable a mow condition while the tractor is moving in a reverse direction R and requires two deliberate sequential actions by the operator in order to enable the mow condition in reverse. The initiation of the override 100 sequence must be started when the dial/key, 26, 30 is in the run position 3 of FIG. 9. The first action of the override 100 sequence is achieved by the operator's application of pressure to the projection 66 of the actuator 28, translating the actuator from position A of FIG. 9 to position B of FIG. 8. The translation of the projection 66 in the first action of the override 100 sequence is against a biased disengage position A attained by the spring 76. The second action of the override 100 sequence includes the rotation of the dial/key 26, 30 from run position 3 of FIG. 8 to the reverse mow enabling position 2 of FIG. 7 while maintaining the projection 66 of actuator 28 in the advanced B position. Once in the reverse mow enabling position 2 of FIG. 7, the actuator 28 is locked in the engaged reverse mow condition, enabling the rotation of the blade 14 while the tractor moves in the reverse direction R. The locking of the actuator 28 illustrated in FIG. 7 is achieved by a plurality of bosses 82 that extend from the housing plate 22, as best seen in FIG. 11, which is a partial assembly view depicting the actuator 28 in the reverse mow enabling position 2 of FIG. 7. The actuator 28 remains locked until the dial/key 26, 30 is rotated to positions 1, 3, or 4. When the actuator 28 is in position A and the dial/key 26, 30 are in position 2 shown in FIG. 6, the actuator includes a slot 84 for avoiding bosses 82 while in position 2 of FIG. 6 and during rotation, and further prevents the advancement of the actuator when located in position 2 of FIG. 6.

Figure 8:
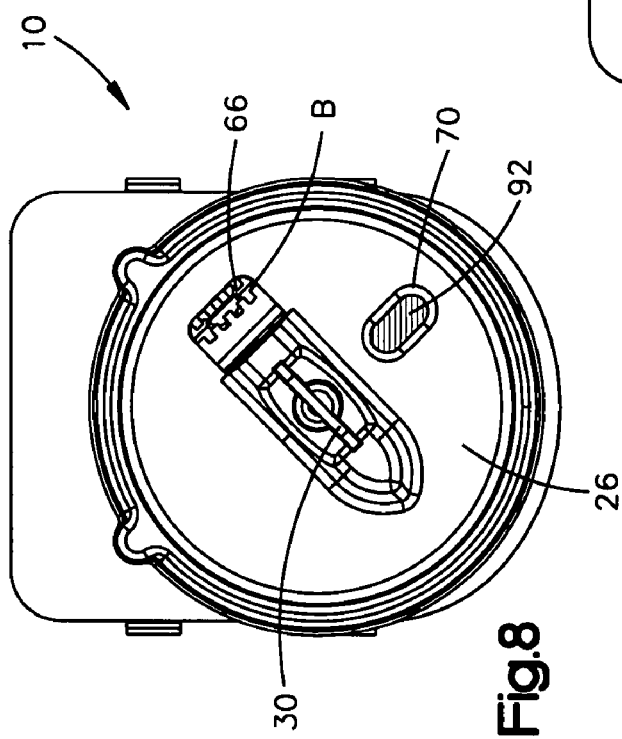
FIG. 8 is a plan view of the switch assembly in a third position depicting the first step of an override sequence illustrating an actuator located in an advanced position.

Upon translation of the projection 66 of the actuator 28 to position B, the status identifier 70 changes from a non-engaged visual identifier 90 (FIG. 9) to an engaged visual identifier 92 (FIGS. 7-8). As illustrated in the exploded assembly of FIG. 3, the non-engaged 90 and engaged 92 visual identifiers are on the surface of the flange 68 of the actuator 28 such that advancement of the projection 66 reflects a change from non-engaged 90 to engaged 92 in the identifier 70, as seen through an opening 74 of the dial 26. Further, the translation of the actuator 28 projection 66 to position B results in the displacement of the plunger switch 36 plunger 42 from the non-engaged run position 3 of FIG. 9 illustrated as position A in the partial assembly view of FIG. 12 to the engaged reverse mow enabling position 2 of FIG. 7 illustrated as position B in FIG. 11. The displacement of the plunger 42 provides electrical signals in the plunger switch 36, engaging the blade 14 and creating a mow condition in reverse through electrical connection 20a-20d via a wiring harness (not shown) connected to the receptacle 20.

Figure 12:
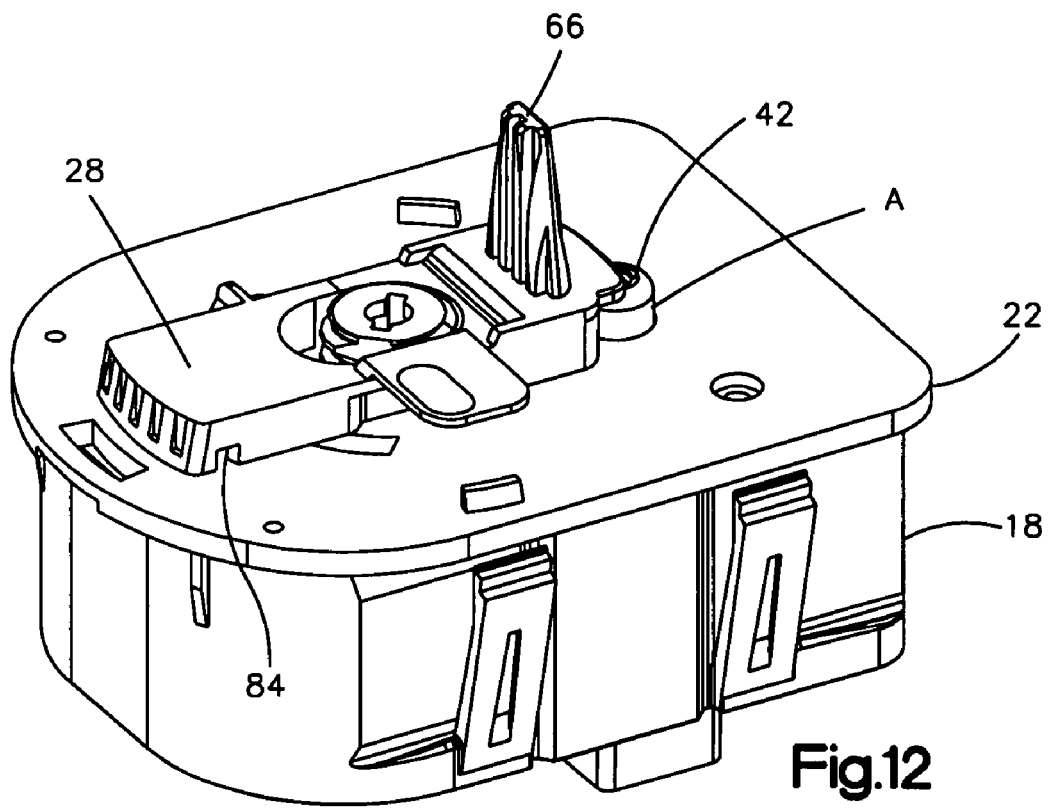
FIG. 12 is a partial assembly view of the switch assembly including an actuator located in a no reverse mow run position of FIG. 6.
Figure 13A:
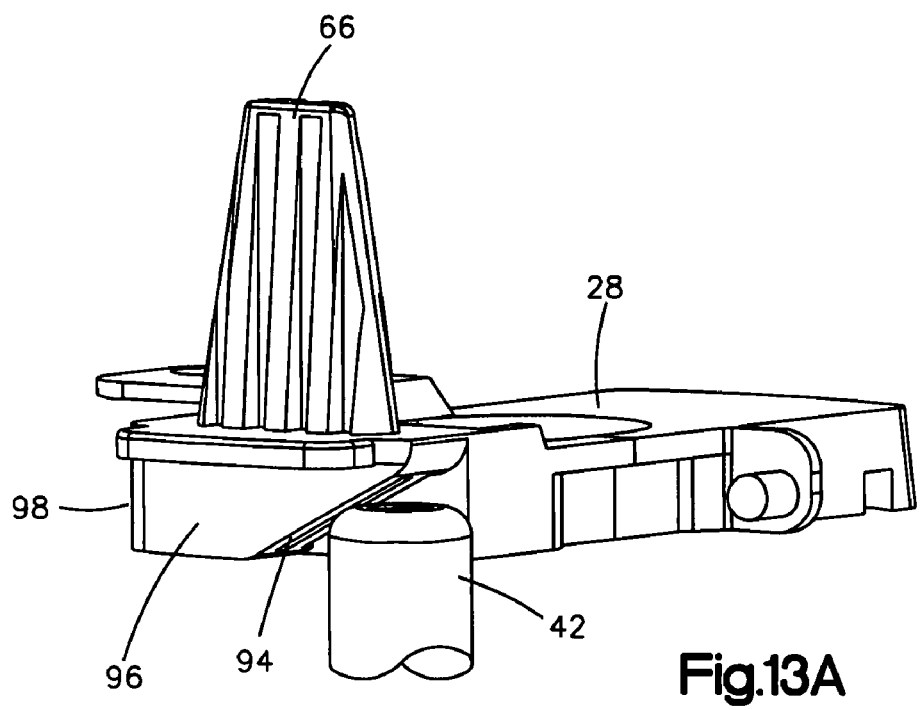
FIG. 13A is an isometric view of a working end of an actuator engaging a plunger during rotation of a dial from the position shown in FIG. 8 to the position shown in FIG. 7.
Figure 13B:
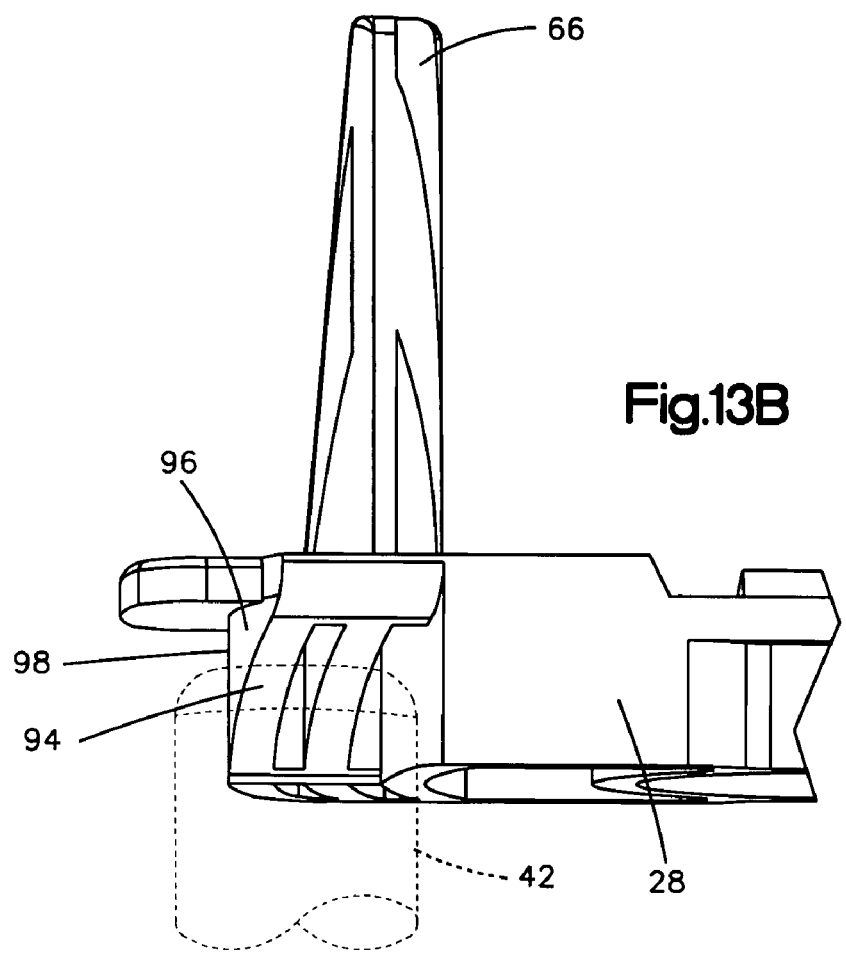
FIG. 13B is a second isometric view of the working end of the actuator engaging the plunger of FIG. 13A during rotation of the dial from the position shown in FIG. 8 to the position shown in FIG. 7.

The construction of the switch assembly 10 allows only for the displacement of the plunger 42 when the dial/key 26, 30 is rotated from the run position 3 of FIG. 8 to the reverse mow enabling position 2 of FIG. 7. This condition is achieved as a result of an incline 94 located in a working end 96 of the actuator 28 as illustrated in FIGS. 13A and 13B. As the dial/key 26, 30 is rotated from the run position 3 of FIG. 8 to the reverse mow enabling position 2 of FIG. 7, the incline 94 engages the plunger 42, depressing it from position A to position B as illustrated in FIGS. 12, 11, respectively. Opposite the incline 94 on the working end 96 of the actuator 28 is an abutment 98 that prevents the depression of the plunger 42 and advancement of the projection 66 of the actuator 28 should an attempt to engage the reverse mow enabling condition when rotating the dial/key 26, 30 from position 1 to position 2. Stated another way, advancing the actuator 28 in position 1 is precluded from rotation to the reverse mow enabling position 2 as a result of the abutment's 98 interference with the plunger 42. The design of the override 100 automatically disengages whenever the operator rotates the dial/key 26, 30 to any position from the reverse mow enabling position 2 illustrated in FIG. 7, including rotating the dial 26 to the off position 1 or start position 4.

During operation, should the operator rotate the dial 26 from the reverse mow enabling position 2 of FIG. 7 to position 1 or position 3, the plunger 42 extends outwardly from position B to position A of FIGS. 11, 12 disabling the reverse mow condition. Further, the reverse mow condition or forward mow condition becomes disabled if the operator would leave the seat of the tractor 12 independent of the dial/key 26, 30 position. Alternatively, the engine will turn-off if the operator would leave the seat of the tractor 12.

Such improvements, changes in positioning, and modifications within the skill of the art are intended to be covered by the appended claims. Further, the invention as a whole has been described with a certain degree of particularity, it should be understood that various changes can be made by those skilled in the art without departing from the scope of the invention hereinafter claimed.

I claim:

1. A switch assembly comprising:
   an ignition switch rotatable through a plurality of positions;
   a housing for supporting said ignition switch;
   an actuator movably located in said housing for enabling a reverse mow condition by displacing the actuator from a rest position to two separate and distinct positions; and
   an inclined surface on an end of said actuator for engaging a plunger while in said enabling position and while being rotated from said non-enabling orientation to said enabling orientation such that the plunger becomes engaged.

2. The switch assembly of claim 1 further comprising an abutment opposite said inclined surface on the end of the actuator wherein said abutment precludes rotation of said dial in a direction of the abutment when the actuator is in the enabling position.

3. A switch assembly for enabling a reverse mow condition for a tractor during or prior to moving in a reverse direction comprising:
   a dial that is rotated in unison with an ignition switch through a plurality of positions;
   a housing for supporting said ignition switch;
   an actuator moveable with respect to said dial, the actuator having first and second ends;
   a plunger switch having a plunger that when depressed enables the tractor for a reverse mow condition;
   an inclined surface located at said first end of said actuator that graduates to an abutment on a side of the actuator opposite the inclined surface side on the first end;
   wherein a reverse mow condition is sequentially enabled when said actuator is translated from a non-enabling position to an enabling position and said dial is rotated from a non-enabling orientation to an enabling orientation.

4. The switch assembly of claim 3 further comprising a locking mechanism for maintaining said actuator in the enabling position while located in the enabling orientation.

5. The switch assembly of claim 4 wherein said locking mechanism includes a plurality of bosses that contact said actuator when in the enabling position while located in the enabling orientation.

6. The switch assembly of claim 3 wherein rotation of the dial in any direction away from the enabling orientation results in termination of the reverse mowing condition.

7. The switch assembly of claim 3 wherein rotation of the dial in any direction away from the enabling orientation while in the enabling position and mowing in reverse results in the termination of the mower engine.

8. The mow switch assembly of claim 3 wherein said reverse mow condition is enabled when said actuator is translated from non-enabling position to an enabling position followed by continuous and sequential rotating of said dial from a non-enabling orientation to a enabling orientation.

9. A switch assembly comprising:
   i. a plunger switch for opening and closing an electric circuit;
   ii. an ignition switch for opening and closing start and stop electrical circuits for a gasoline powered engine;

iii. a housing for supporting said ignition switch and said plunger switch;
iv. a dial that rotates in unison with said ignition switch through a plurality of positions; and
v. an actuator movably located between said housing and said dial used for engaging said plunger switch wherein said plunger switch is actuated by said actuator when said actuator is translated to an enabling position and dial is rotated from a non-enabling orientation to an enabling orientation.

10. A switch assembly for enabling a forward and reverse mow condition in a lawn tractor, the switch assembly comprising:
   an ignition switch adapted for receiving a key, the ignition switch rotatable through a plurality of positions;
   a housing for supporting said ignition switch;
   a dial rotatably connected to said housing by a retaining ring;
   a reverse mow enabling switch having a movably located plunger such that when said plunger is actuated from a first position to a second position operation of a mowing condition is enabled when a lawn tractor is operated in a reverse direction;
   an actuator movably located between said dial and said housing for actuating said plunger when in an advanced position, said actuator comprising a working end with an inclined surface for actuating said plunger from said first position to said second position; and
   a boss extending from said housing adapted to selectively lock said actuator from moving into said advanced position.

11. The switch assembly of claim 10 further comprising an aperture located in said actuator for selectively receiving said boss.

12. The switch assembly of claim 10 further comprising an abutment located on said working end opposite said inclined surface that prevents said plunger from actuating from said first position to said second position when said actuator is in said advanced position.

13. The switch assembly of claim 10 wherein said actuator further comprises a flange portion comprising a status identifier that moves when said actuator is moved from a retracted position to said advanced position.

14. The switch assembly of claim 13 wherein said dial comprises an opening for viewing said status identifier.

15. The switch assembly of claim 14 further comprising a biasing member positioned between said dial and actuator, said biasing member influencing said actuator to said retracted position.

* * * * *